Patented Feb. 24, 1931

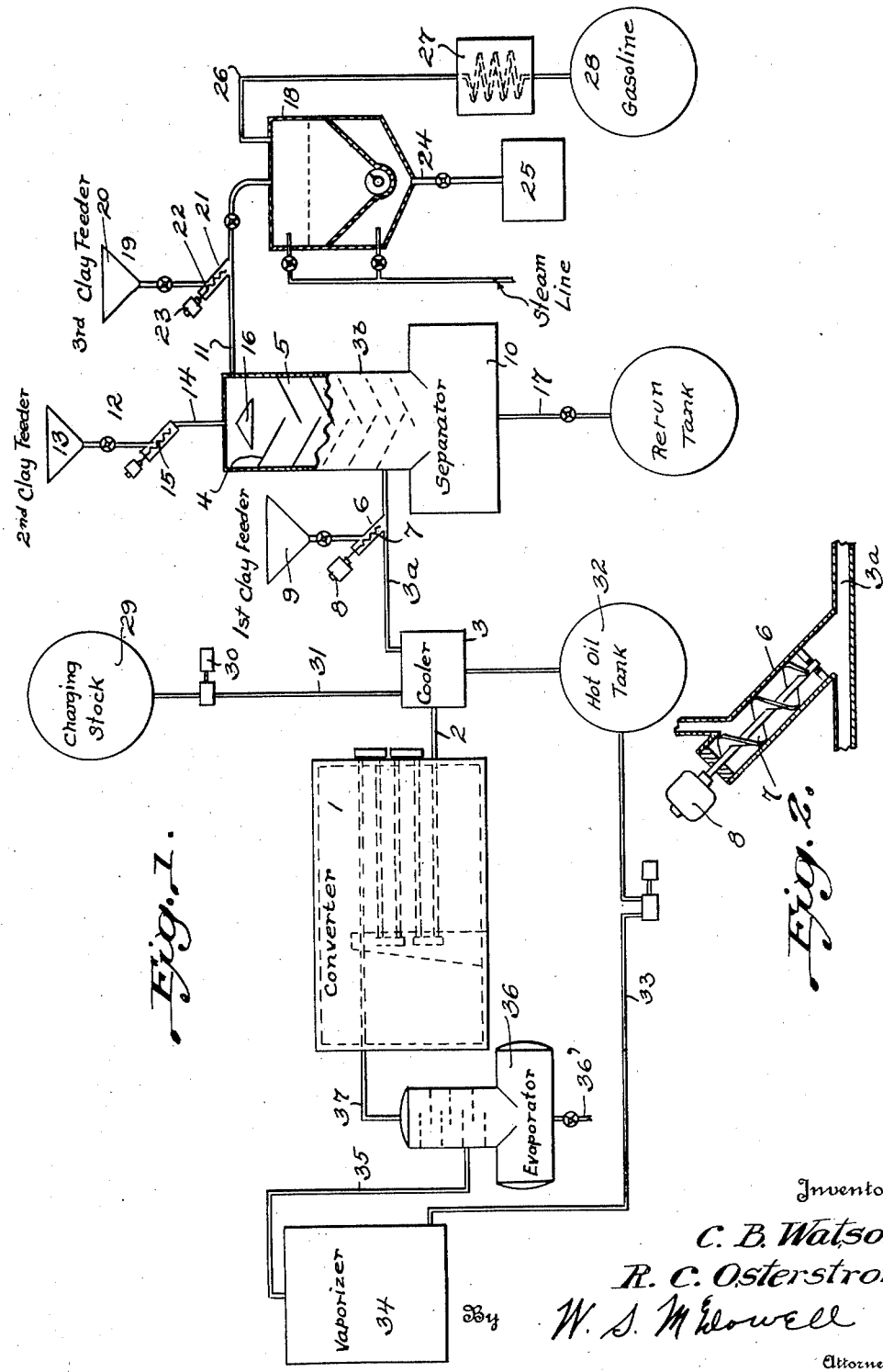

1,793,885

UNITED STATES PATENT OFFICE

CORNELIUS B. WATSON AND RUDOLPH C. OSTERSTROM, OF CHICAGO, ILLINOIS, ASSIGNORS TO THE PURE OIL COMPANY, OF CHICAGO, ILLINOIS, A CORPORATION OF OHIO

METHOD OF PURIFYING CRACKED PETROLEUM VAPORS

Application filed August 21, 1928. Serial No. 300,996.

This invention relates to an improved method of treating petroleum oils following molecular decomposition of such oils and while the latter are maintained in a state of vapor and undergoing fractionation, whereby to improve the color thereof and remove from the vapors or oils under treatment the fractions which tend to produce gum and other undesirable compounds in the final product.

The invention is particularly applicable to vapor phase methods of oil conversion. In such methods considerable difficulty has been encountered in stabilizing the color of the completed motor fuel product, and particularly in effecting the complete and permanent removal of the gum content thereof. A common method employed by oil refiners in efforts to control these conditions consists in passing oil vapor, following conversion, through a closed vessel containing a bed of filtering material such as fuller's earth. Such a system operates satisfactorily when the system is initially operated, but the effectiveness thereof diminishes rapidly after use, due in all probability to the saturation of polymers or gummy oil fractions on the part of the clay, which interferes with the absorptive properties of the clay.

In accordance with the present invention a system of treating oil vapors with clay or other equivalent materials is provided wherein the clay is continuously introduced and removed from the system so that the oil vapor is constantly maintained in contact with fresh treating material in order that the system may operate at a uniform degree of efficiency at all times.

A further object of the invention is to provide for a substantially complete removal of the undesirable gum and color producing compounds from the oil vapors and at the same time to use but a minimum quantity of the treating material, in order that the system may be operated economically as well as efficiently in carrying out the ends thereof.

For a further understanding of the invention, reference is to be had to the following description and the accompanying drawing, wherein:

Figure 1 represents a diagrammatic view of apparatus which may be employed in connection with the invention, and Figure 2 is an enlarged detail view.

Referring more particularly to the drawings, the numeral 1 designates an oil converter or heater. This converter or heater may be of any desired form and construction wherein the oil, passing through the same, is heated to a converting temperature of for example 1000° F. so as to vaporize the oil and effect its molecular decomposition. The converted oil in vapor form passes from the converter by way of a pipe line 2 and into a cooler 3 from which it is led by a line 3a to a fractionating tower 3b. This tower is provided with a plurality of angularly disposed stationary baffle walls 4, which are situated in the upstanding column portion 5 of the tower.

Entering the line 3a is a clay feeding duct 6 which, in this instance, is provided with a worm or conveyor 7, driven, for example, by a variable speed motor 8. The inlet end of the duct 6 is connected with a clay containing hopper 9 and it will be seen that by operating the motor 8 the clay, at a controlled rate of flow, may be introduced into the pipe 3a where it is brought into intimate contact with the oil vapors passing from the converter 1 to the fractionating column 3b. The heavier fractions, or what may be termed the undesirable fractions of the oil vapor, are absorbed by the clay and drop into the enlarged bottom 10 of the fractionating column 3.

The lighter oil fractions or vapors arise in the fractionating tower and follow the customary tortuous path while passing upwardly through the tower by reason of their contact with the baffle walls 4. This results, as usual, in the separation of the high boiling point fractions of the oil from those of lower boiling point, the latter passing outwardly from the tower by way of the overhead line 11, while the liquefied or condensed fractions move downwardly, contacting with the ascending vapors, so as to scrub the latter, and to collect in the bottom portion 10 of the tower the heavier or liquefied portions.

It is also preferable in some instances to provide a second clay introducing unit in connection with the tower as indicated at 12 in the drawings. This unit corresponds substantially with the previously described unit and may consist of the hopper 13, the feeding duct 14, and the motor driven worm 15. When the second unit is in operation the clay ejected therefrom contacts with a substantially conical and stationary deflector 16 arranged in or near the top of the tower 3. This enables the clay by falling through the column 5, to contact uniformly with the ascending oil vapors, thereby permitting the clay to remove from such vapors the undesirable compounds above mentioned and to permit such compounds and the clay to fall into the bottom of the tower. The bottom of the tower is provided with an outlet line 17 which leads to re-run apparatus (not shown) for the purpose of further heat treating the clay and heavy polymerized oil compounds to recover the lighter fractions of the oil which may be therein contained.

The overhead line 11 extends to an inclosed vessel 18 and if desired, there may be situated in the line 11 a third clay introducing unit 19. This unit may also correspond with the previously described units and in this instance has been shown as consisting of a hopper 20, a feeding duct 21, a worm 22, and a driving motor 23. Thus the vapors passing through the line 11 may be again intermingled with suitable quantities of finely divided clay, such as fuller's earth, for the purpose of procuring a further purification of the oil vapors. The entrained clay introduced into the line 11 is carried by the oil vapor into the vessel 18, in which there takes place a separation of the vapors or lighter fractions of the oil from the heavier liquid fractions. The latter, together with the clay, pass off by way of a line 24, leading from the bottom of the vessel 18, into a separator 25, in which the oil fractions are removed from the clay or other treating material. The lighter fractions which enter the vessel 18 pass overhead by way of a line 26 to a condenser 27, and the finally purified products are then transferred to a storage tank 28 as finished motor fuel. A gas separator may be employed in connection with the condenser 27 to effect the removal of the non-condensibles from the system.

In view of the foregoing it will be seen that the present invention provides for the bringing of the treating material into very intimate contact with the oil vapors, and due to the intimacy of this contact there is effected, first, an efficient removal of the undesirable compounds from the oil and, second, an economy in operation due to the relatively small quantity of treating material required to successfully operate the system. It will be seen that the oil and the treating material are maintained in contact with each other for a sufficient period of time so that the treating material may operate effectively in purifying the oil vapor or in relieving the same of undesired fractions. Further the system operates at relatively low pressures and while the vapors are at high temperature, it having been found that the higher the temperature of the oil vapor, the more effective the treating material is in carrying out its required functions. The clay which accumulates in the vessel 18 may be rejuvenated by cutting off the oil flow through a portion at least of the line 11, and then introducing superheated steam into said line so that said steam will be brought into contact with the clay treating material which accumulates within the vessel 18. The introduction of the steam or other inert gas liquefies the polymers or other heavy oil compounds contained in the clay so that said compounds may be removed from the clay and the latter again rendered suitable for effective operation.

It will be appreciated that the clay may be introduced into the system not only in the form of a finely divided dry material, but may be in the form of a paste, semi-liquid, or liquid state, such as in solution. Again, the various clay introducing units may operate simultaneously or may operate selectively, depending upon operating conditions and the character of the oil being treated.

The charging stock used by the system is contained in the tank 29 and is forced by means of a pump 30 through a pipe line 31 into the cooler 3. This fresh cold stock oil in the cooler 3 is intimately intermingled with the cracked vapors which are discharged at high temperatures, preferably above 1000° F., from the converter so that through the resultant heat interchange the cracked vapors are cooled below decomposition temperatures. The vapors from the cooler 3 pass through the line 3a into the purifying and fractionating apparatus described, whereas the liquefied portions of the stock in the bottom of the cooler is removed to a hot oil tank 32 and is then pumped by way of a pipe line 33 into a vaporizing unit 34. In this unit the temperature of the oil is raised to approximately 650° F., and the vapors are discharged by way of the line 35 into an evaporator 36. In this evaporator the unvaporized portions of the oil are permanently removed from the system by means of the outlet 36' usually as fuel oil, whereas the lighter vaporized portions pass overhead through the pipe line 37 and into the converter. This converter comprises a setting containing tube banks through which the oil under heat treatment passes while in the vapor phase. The temperatures maintained within the setting of the converter is such as to effect the heating of the oil to a cracking temperature in excess of 1000° F. Following such heating the vapors are introduced into the cooler 3 where their temperature is immediately lowered to below 600° F. by being intermingled with the fresh charging stock introduced into the cooler by way of the line 31.

What is claimed is:

1. In a method of converting purifying and decolorizing petroleum oils, the step of passing petroleum oils through a heating zone and in there subjecting the oils to heat sufficient to vaporize the oils and raise the temperature thereof to above 1000° F., cooling the oils immediately upon their release from the heating zone to a temperature not in excess of 600° F., passing the vapors remaining following the cooling operation into a fractionating zone, and introducing into said vapors between the cooler and the fractionating zone a quantity of a refining agent having substantially the properties of fuller's earth.

2. In a method of treating petroleum oils, the steps of subjecting petroleum oil to temperatures sufficiently high to vaporize and effect molecular decomposition thereof, then cooling the oils to a temperature sufficient to arrest conversion reactions therein, passing the remaining vapors from the cooling to a fractionating zone and introducing into such vapors during their passage between the cooling and fractionating zones a body of purifying material having substantially the properties of fuller's earth.

3. In a method of treating petroleum oils, the steps of heating petroleum oil under such conditions as to vaporize and effect molecular decomposition thereof, introducing the oils following such heat treatment into a cooling zone to lower the temperatures of the vapors sufficiently to arrest conversion reactions, then passing the remaining vapors at a temperature in excess of 450° F. from the cooling to a fractionating zone, and introducing into such vapors while the latter are in transit between said zones predetermined quantities of fuller's earth.

4. In a continuous method of converting and purifying petroleum oils, the steps of heat treating petroleum oils to vaporize the same and to break down the higher boiling point compounds thereof into compounds of relatively lower boiling points, passing said vapors from said heating zone in a confined continuously flowing stream to a fractionating zone, and introducing into said vapors flowing between said zones regulatable quantities of purifying material of the fuller's earth.

5. In a continuous method of converting and purifying petroleum oils, the steps of heat treating petroleum oils to vaporize the same and to break down the higher boiling point compounds thereof into compounds of relatively lower boiling points, passing said vapors from said heating zone in a confined continuously flowing stream to a fractionating zone, and introducing into said vapors flowing between said zones regulatable quantities of adsorptive purifying material of the nature of fuller's earth, subjecting said vapors to fractionation and separately removing the lighter and vaporous fractions from a liquefied clay-polymer fraction formed in said fractionating zone.

6. A method of treating petroleum oil which consists in subjecting petroleum oil to a temperature sufficiently high to vaporize and effect molecular decomposition thereof, cooling said vapors to a temperature sufficient to arrest conversion reactions therein, removing oil liquefied by said cooling, passing the remaining vapors from the cooling to a fractionating zone, introducing into said vapors between said zones predetermined quantities of an adsorptive purifying material of the nature of fuller's earth, removing purified vapors from said fractionating zone and condensing said vapors.

7. A method of treating petroleum oils comprising, subjecting petroleum oil to a temperature sufficiently high to vaporize and effect molecular decomposition thereof, cooling said vapors to a temperature sufficient to arrest conversion reactions therein, removing oil liquefied by said cooling from said vapors, passing the remaining vapors from the cooling to a fractionating zone, introducing predetermined quantities of a purifying material of the nature of fuller's earth into said vapors between said zones, subjecting said vapors to fractionization in said fractionating zone, separately removing a liquefied clay-polymer fraction formed in said fractionating zone, separately removing the lighter vaporous fractions from the fractionating zone, introducing a purifying material having the properties of fuller's earth into said purified vapors from said fractionating zone, and then separating said vapors from said purifying material.

8. In a method of treating cracked petroleum vapors, the steps of continuously passing cracked petroleum vapors from a cracking zone into a fractionating zone, introducing into the vapor stream between said zones a refining agent of the nature of fuller's earth, introducing finely divided purifying agent of the nature of fuller's earth into the upper portion of said fractionating zone, permitting said finely divided purifying agent to fall in substantially dry state through said vapors in said zone in counter-current relation thereto, and separately removing the purified oil vapors from said fractionating zone and the spent purifying agent and liquefied and heavier oil fractions from said fractionating zone.

9. A continuous method of converting and purifying petroleum oils which consists in subjecting petroleum oil to a temperature sufficiently high to vaporize and effect molecular decomposition thereof, cooling said vapors to a temperature sufficient to arrest conversion reactions therein, removing oil liquefied by said cooling from said vapors, passing the remaining vapors from the cooling to a fractionating zone, introducing finely divided purifying agent of the nature of fuller's earth into the upper portion of said fractionating zone, permitting said finely divided purifying agent to fall in substantially dry state through such vapors in counter-current relation thereto, separately removing partially purified vapors from the top of said zone and purifying agent and heavier liquefied fractions of oil from the bottom of said zone, passing the partially purified vapors from the top of said fractionating zone to a separating zone, introducing finely divided purifying agent of the nature of fuller's earth into said partially purified vapors between said fractionating and separating zones, separating purified vapors from the purifying agent in said separating zone, and separately condensing the purified vapors from said separating zone.

In testimony whereof we affix our signatures.

CORNELIUS B. WATSON.
RUDOLPH C. OSTERSTROM.